UNITED STATES PATENT OFFICE.

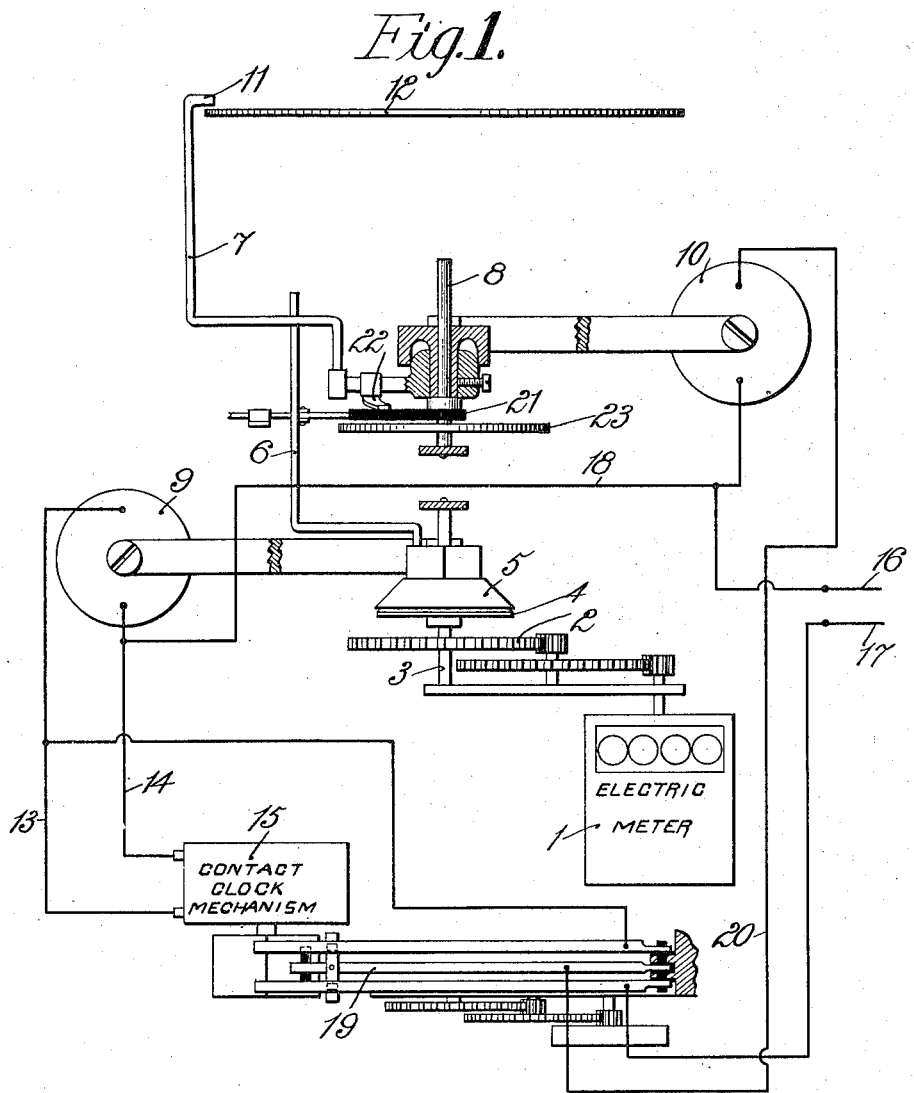

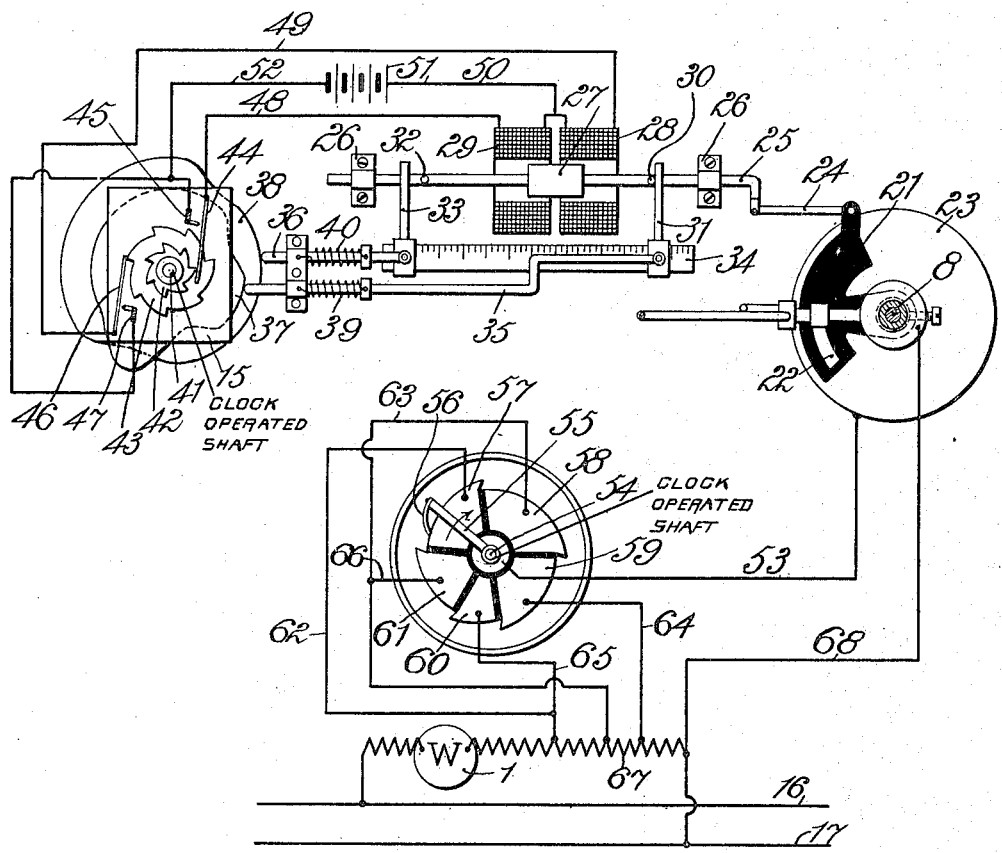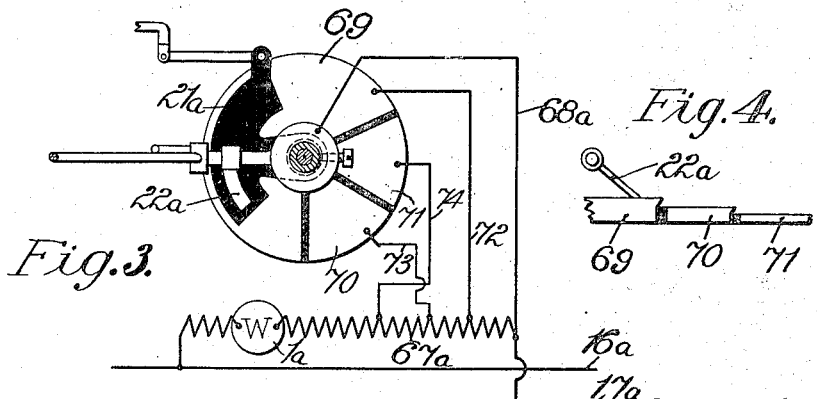

VLADIMIR KARAPETOFF, OF ITHACA, NEW YORK, ASSIGNOR, BY MESNE ASSIGNMENTS, TO CHICAGO ELECTRIC METER COMPANY, OF CHICAGO, ILLINOIS, A CORPORATION OF ILLINOIS.

VARIABLE-RATE INTEGRATING ELECTRICITY-METER.

1,146,172.

Specification of Letters Patent.

Patented July 13, 1915.

Application filed April 1, 1912. Serial No. 687,898.

*To all whom it may concern:*

Be it known that I, VLADIMIR KARAPETOFF, a citizen of the United States, residing at Ithaca, in the county of Tompkins and State of New York, have invented certain new and useful Improvements in Variable-Rate Integrating Electricity - Meters, of which the following is a full, clear, concise, and exact description, reference being had to the accompanying drawings, forming a part of this specification.

My invention relates to an improved construction of variable rate integrating electricity meters by which the rate of operation of the meter is changed according to the quantity of electricity integrated during any predetermined interval. In the past, it has been proposed to change the rate of operation of electricity meters according to the intensity of current flow at any instant, that is to say, any particular consumer has a maximum current assigned to him which he may use at a first rate, but, if for any reason he exceeds this limiting current and uses current in excess of said limit, he is penalized in one way or another, as, for example, by changing the rate at which the electricity meter is operated, which meter is used as the basis for making a charge for the electricity used.

By my invention, I provide a means by which the integrated value of the electricity for any one of a number of successive time intervals is made the basis for determining the change of operation of the electricity meter rather than the instantaneous value of the current, and this is a more reasonable plan for charging for excess consumption, since any one of a number of contributing causes may give a high instantaneous value to the current flowing through the customer's circuit without any fault of the customer, which high current value is not a true indication of the demand made by him upon the generator supplying him with electricity. The integrated value, however, since it extends over an appreciable time interval, is a true indication of the energy or current required by the consumer and, therefore, is a proper basis for determining the charge to be made to him for current or energy used in excess of the predetermined maximum.

My invention is equally applicable to electricity meters, whether they be designed to integrate the current used by a customer and express the result in ampere hours or its equivalent, or whether they be designed to integrate the electric energy used by the customer and indicate the result in watt-hours or kilowatt hours, or their equivalent.

The several drawings illustrating my invention are as follows:

Figure 1 shows diagrammatically an electricity meter and the mechanism associated therewith for indicating the amounts of integrated current or energy for any one of successive time intervals, as well as the mechanism employed for determining the rate of operation of the meter. Fig. 2 is a diagrammatic view of the controlling devices employed in connection with the electricity meter for changing its rate of operation. Fig. 3 shows a modified construction of circuit controlling mechanism for use with the rate changing mechanism shown in Figs. 1 and 2. Fig. 4 is a detail view of the circuit controlling mechanism shown in Fig. 3.

Similar numerals refer to similar parts throughout the several views.

As shown in Fig. 1, the electricity meter 1 is connected through a reducing train of gearing 2 with a shaft 3, which has rigidly secured thereto one member 4 of a friction clutch, the other member 5 of which is free from the shaft 3 and rotated only by its frictional engagement with the part 4. The part 5 of the friction clutch carries a bent arm 6, the upper end of which engages the pointer carrying member 7, when the arm 6 is rotated by the operation of the shaft 3. The member 7 is rigidly secured to a shaft 8, which is rotated by rotation of the member 7. An electromagnet 9 is provided for disengaging the members 4 and 5 of the friction clutch and for returning the member 5 and arm 6 to their initial position at recurring intervals as desired, and a similar magnet 10 is provided for returning the shaft 8 and member 7 to their initial position when desired. The member 7 carries a pointer 11 coöperating with a dial 12 to indicate the integrated current or energy for any one of successive intervals determined by the operation of the magnet 9.

The operation of the parts thus far described is similar to the operation of the corresponding parts in my Patent No. 972,538, issued October 11, 1910, upon which the present invention is an improvement. The returning magnets operate substantially as shown and described in said patent and the arm 6 and member 7 coöperate to indicate the maximum integrated current or energy in substantially the manner that the corresponding parts operate in said patent. The magnet 9 is connected by wires 13 and 14 with time-controlled contact mechanism 15, which periodically closes an energizing circuit through the magnet to cause its operation, current being supplied for this purpose from the mains 16 and 17 through the wire 18 and the contact mechanism 19. The intervals between successive actuations of the magnets 9 are preferably short, as, for example, one minute, or five minutes, while the intervals between successive actuations of the magnet 10, which are also controlled by the time-controlled contact mechanism 15 and the switching mechanism 19, through wires 18 and 20, are preferably much longer as, for example, twelve hours or twenty-four hours or one week, as may be desired. The construction and operation of the time-controlled mechanism 15 and the contact mechanism 19, by which the magnets 9 and 10 are energized, is substantially the same as that shown and described in my patent above mentioned, as a result of which a detailed description of these parts as well as a detailed description of the mechanism employed for returning the arm 6 and the member 7 are not here given.

The shaft 8 has loosely mounted upon it a sector 21 of insulating material, upon which a brush 22, carried by the member 7, normally rests. The sector 21 is disposed above the contact plate 23, which is fixed and adapted to be engaged by the spring 22 when it is moved from engagement with the sector 21.

As shown in Fig. 2, the sector 21 has pivotally secured at one of its corners a link 24, the other end of which is connected with a rod 25 mounted to slide in suitable bearings 26, 26. The rod 25 carries a core 27 adapted to be attracted and operated either by the solenoid 28 or the solenoid 29, by which means direction of motion of the rod 25 is determined. When the solenoid 28 is energized, the rod 25 is moved to the right until the pin 30, carried by it, engages the stop 31, as a result of which the sector 21 is rotated upon its support around to the right as far as the stop 31 will permit it to go. When the solenoid 29 is energized, the rod 25 is moved to the left until the pin 32 carried by it engages the stop 33, as a result of which the sector 21 is rotated around to the left upon its support as far as the stop 33 will permit it to go. The stops 31 and 33 are slidingly mounted upon a bar 34 and connected by rods 35 and 36 with the surfaces of cams 37 and 38, said rods being held in engagement with the surfaces of the cams by means of the springs 39 and 40, respectively. The cams 37 and 38 are mounted upon and driven by a shaft 41 of the time-controlled mechanism 15, which shaft also carries the contact cams 42 and 43. The contact cam 42 engages the contact spring 44 in a manner to determine its engagement with a fixed contact 45, and the contact cam 43 engages contact spring 46 to determine its engagement with a fixed contact 47. The contact springs 44 and 46 are connected by wires 48 and 49 with the solenoids 29 and 28, respectively, the other terminals of which solenoids are connected together, and by means of wire 50, with one terminal of the battery 51, the other terminal of which is connected by wire 52 with the contacts 45 and 47. The cams 37, 38, 42 and 43 may be given any desired conformation and the shaft 41 may be given any desired rate of rotation so that the solenoids 28 and 29 may be energized as desired to determine within any particular limits of operation controlled by the stops 31 and 33 two different permissible maxima for the customer, so that, for example, one may be in control during the daytime, while the other may be in control at night, or one may control during certain hours of the day, while the other controls during other hours of the day, as desired. Furthermore, the cams 37 and 38 by their conformation may determine different limiting conditions for different days of the week, so that, for example, a different maximum consumption is permitted on Sunday from that which is permitted on weekdays.

The contact disk 23 is connected by wire 53 with a shaft 54 driven by the time-controlled mechanism, so that an arm 55, driven by said shaft, will bring a contact spring 56, carried by said arm, successively into engagement with the contact blocks 57, 58, 59, 60 and 61. The contact blocks 57, 58, 59, 60 and 61 are connected by wires 62, 63, 64, 65 and 66 with different points of the resistance 67 included in the pressure circuit of the watt meter 1, as a result of which the amount of resistance included at any time between the wire 53 and the wire 68 may be determined, and this amount of resistance may be changed as desired at different times of the day. The wire 68 extends from one terminal of the resistance 67 to the shaft 8 carrying the contact spring 22, and this wire is also connected with one of the main feeders 17, the other of which is connected with the other terminal of the pressure circuit of the meter. As a result of the construction described, when the maximum current or energy permitted by the controlling cams 37, 38, 42 and 43 is exceeded and the contact spring 22 is brought into engagement with the contact disk 23, a part of the resistance included in the pressure circuit of the watt meter is short-circuited, and the rate of operation of the watt meter is changed, depending upon the design of the instrument, the usual effect being to increase the speed of the instrument. The amount of resistance short-circuited is determined by the position of the arm 55, as a result of which a different penalty may be imposed upon the customer for exceeding a predetermined limit, according to the time of the day at which the limit is exceeded without in any way changing the maximum limit, as might be done by means of the controlling cams described.

In the modification shown in Figs. 3 and 4, the controlling arm 55 and the contacts associated therewith are eliminated and the contact disk 23 is replaced by a contact disk having a plurality of sections 69, 70 and 71, connected by wires 72, 73, and 74 with different portions of the resistance $67^a$ included in the pressure circuit of the watt meter $1^a$. As a result of the construction described, when the maximum current or energy permitted by the adjustment of the sector $21^a$ is exceeded and the contact spring $22^a$ is moved from the sector $21^a$, the engagement of the contact spring $22^a$ with one of the contact blocks 69, 70 and 71 causes a short-circuiting directly of a part of the resistance $67^a$, the amount of the resistance short-circuited depending upon the amount of excess for any one of the successive time intervals determined by the time-controlled mechanism. For example, if the contact spring $22^a$ is moved but slightly from engagement with the sector $21^a$ so as to engage the contact block 69, the first section of the resistance $67^a$ is short circuited. If, however, during any one of the time intervals determined by the time-controlled mechanism, the spring $22^a$ is moved into engagement with the contact block 70, another section of the resistance $67^a$ is also short-circuited, and so on, and thus a means is provided for increasing the penalty which the customer must pay according to the amount of excess of his integrated current or energy consumption for any one of predetermined recurring intervals. As shown in Fig. 4, the contact blocks 69, 70, 71 are preferably conformed so that the contact spring $22^a$ passes from one block directly into engagement with the next without the possibility of intermediate dead spaces upon which the contact spring $22^a$ might rest, so that at all times that the spring $22^a$ is advanced from engagement with the sector $21^a$ some portion of the resistance $67^a$ will be short-circuited.

While I have shown my invention in the particular embodiments herein described, I do not, however, limit myself to these constructions, but may employ such equivalents as will occur to those skilled in the art.

What I claim is:

1. In combination, an integrating electricity meter, devices advanced to indicate the maximum electricity integrated during any one of successive time intervals, contact mechanism actuated by the meter to change its rate of operation when the integrated electricity exceeds a predetermined amount for any one of such intervals, and controlling mechanism for determining the integrated value at which the contact mechanism becomes effective.

2. In combination, an integrating electricity meter, devices for indicating the amount of its operation, mechanism for changing the rate of actuation of the indicating devices when a pretermined limiting amount of electricty is integrated, electromagnetic mechanism for changing the said limiting amount within variable limits, and time-controlled devices for changing the said variable limits.

3. In combination, an integrating electricity meter, devices for indicating the amount of its operation, mechanism for changing the rate of actuation of the indicating devices when a predetermined limiting amount of electricity is integrated, a first solenoid for establishing a first value for said limiting amount, a first stop for limiting the motion of the parts controlled by said first solenoid, a second solenoid for establishing a second value for said limiting amount, a second stop for limiting the motion of the devices operated by the second solenoid, and time-controlled mechanism for changing the position of the first stop.

4. In combination, an integrating electricity meter, devices for indicating the amount of its operation, mechanism for changing the rate of actuation of the indicating devices when a predetermined limiting amount of electricity is integrated, a first solenoid for establishing a first value for said limiting amount, a first stop for limiting the motion of the parts controlled by said first solenoid, a second solenoid for establishing a second value for said limiting amount, a second stop for limiting the motion of the devices operated by the second solenoid, and time-controlled mechanism for changing the position of both of said stops.

5. In combination, an integrating electricity meter, and mechanism for changing the rate of operation of the meter when the electricity integrated by it during a given time interval exceeds a predetermined amount.

6. In combination, an integrating electricity meter, a resistance in circuit with the meter, and mechanism for short-circuting a part of said resistance when the electricity integrated by the meter for a given interval exceeds a predetermined amount.

7. In combination, an integrating electricity meter, mechanism for changing the rate of operation of the meter when the electricity integrated by it during a given time interval exceeds a predetermined amount, and time-controlled devices for changing the predetermined amount.

8. In combination, an integrating electricity meter, a resistance in circuit with the meter, mechanism for short-circuiting a part of said resistance when the electricity integrated by the meter for a given interval exceeds a predetermined amount, and time-controlled devices for changing the predetermined amount.

9. In combination, an integrating electricity meter, and mechanism for changing the rate of operation of the meter when the electricity integrated by it during a given time interval exceeds a predetermined amount, the amount of change in the rate of operation of the meter being determined by the amount of excess of the integrated electricity over the predetermined amount.

10. In combination, an integrating electricity meter, a resistance in circuit with the meter, and mechanism for short-circuiting a part of said resistance when the electricity integrated by the meter for a given interval exceeds a predetermined amount, the amount of resistance short circuited being determined by the amount of the excess of the integrated electricity over the predetermined amount.

In witness whereof, I hereunto subscribe my name this 27th day of March, A. D., 1912.

VLADIMIR KARAPETOFF.

Witnesses:
E. W. CHILSORY,
H. S. COLLETTI.